United States Patent [19]

Barber et al.

[11] Patent Number: 4,821,193

[45] Date of Patent: Apr. 11, 1989

[54] DIGITAL CONTROL FOR GAS TURBINE ENGINE

[75] Inventors: John H. Barber, West Chester; Curtis L. Brown, Cincinnati, both of Ohio; Vernon R. Duncan, Erlanger, Ky.; Carl E. Knox, Vestal, N.Y.; Roderick D. Owen, Cincinnati, Ohio

[73] Assignee: General Electric Company, Cincinnati, Ohio

[21] Appl. No.: 769,516

[22] Filed: Aug. 26, 1985

[51] Int. Cl.$^4$ .................. G06F 11/00; G05D 7/06
[52] U.S. Cl. .................. 364/431.02; 60/39.281; 364/187; 371/14
[58] Field of Search .................. 364/431.02, 431.04, 364/492, 494, 187; 371/8, 9, 14; 123/446, 458; 60/39.02, 39.281

[56] References Cited

U.S. PATENT DOCUMENTS

| | | | |
|---|---|---|---|
| 3,882,456 | 5/1975 | Takada | 371/8 |
| 3,978,659 | 9/1976 | Smith et al. | 364/187 |
| 4,032,757 | 6/1977 | Eccles | 364/431.02 |
| 4,115,998 | 9/1978 | Gilbert et al. | 364/431.02 |
| 4,363,098 | 12/1982 | Buus et al. | 364/187 |
| 4,494,208 | 1/1985 | Chang | 364/494 |
| 4,504,905 | 3/1985 | Burrage | 371/9 |
| 4,581,701 | 4/1986 | Hess et al. | 371/8 |
| 4,716,531 | 12/1987 | Saunders et al. | 364/431.02 |

OTHER PUBLICATIONS

Rolls-Royce plc, Great Britain: The Jet Engine, pp. 1-57 and 113-145 (Chapter 12, Controls and Instrumentation).

Primary Examiner—Felix D. Gruber
Attorney, Agent, or Firm—Derek P. Lawrence; Nathan D. Herkamp

[57] ABSTRACT

In a two-channel control system for a gas turbine engine, the occurrence of a fault in the engine causes the control system to switch from one channel to the other. If it is found that neither channel is operative, the invention terminates fuel delivery, thus stopping the engine.

6 Claims, 2 Drawing Sheets

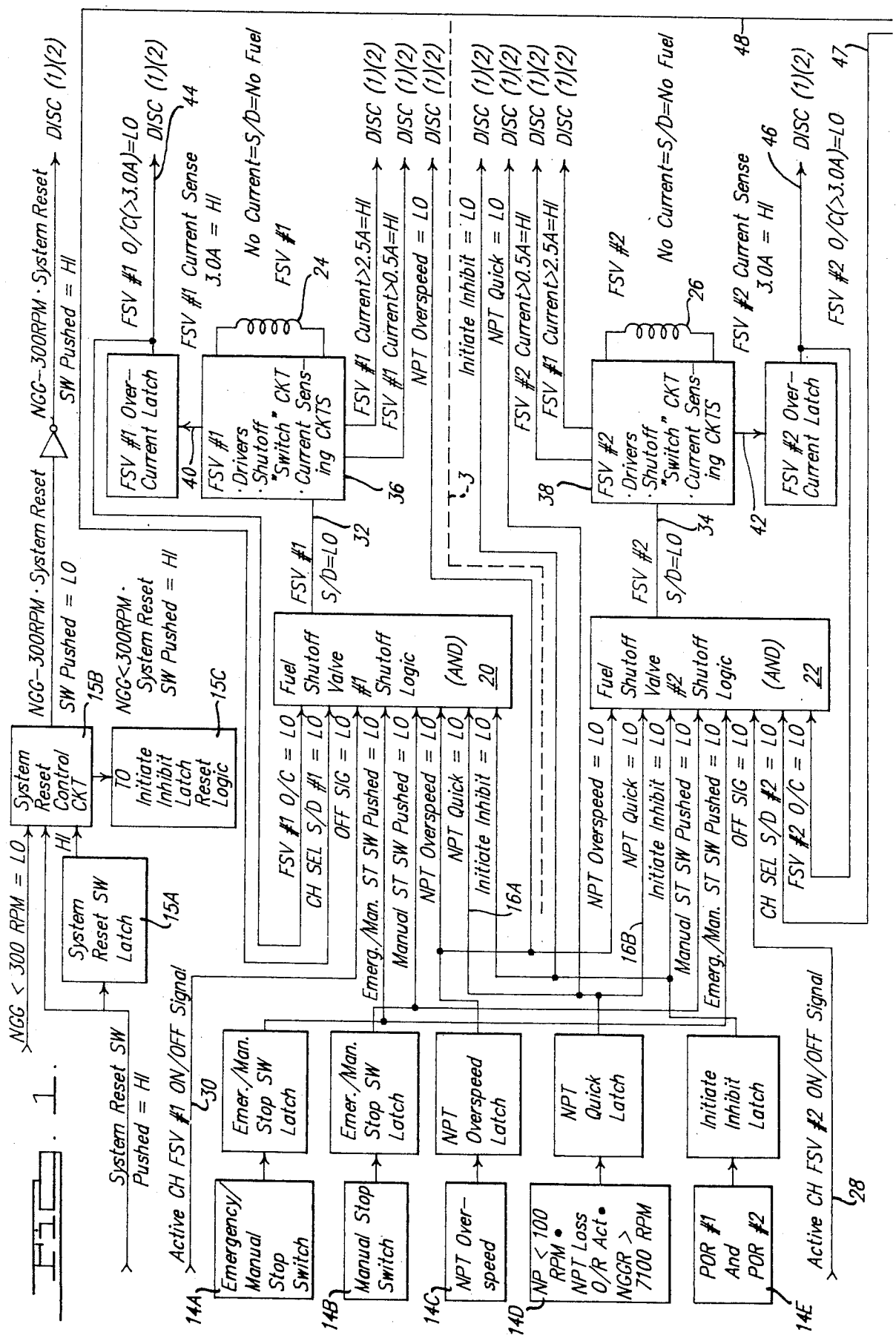

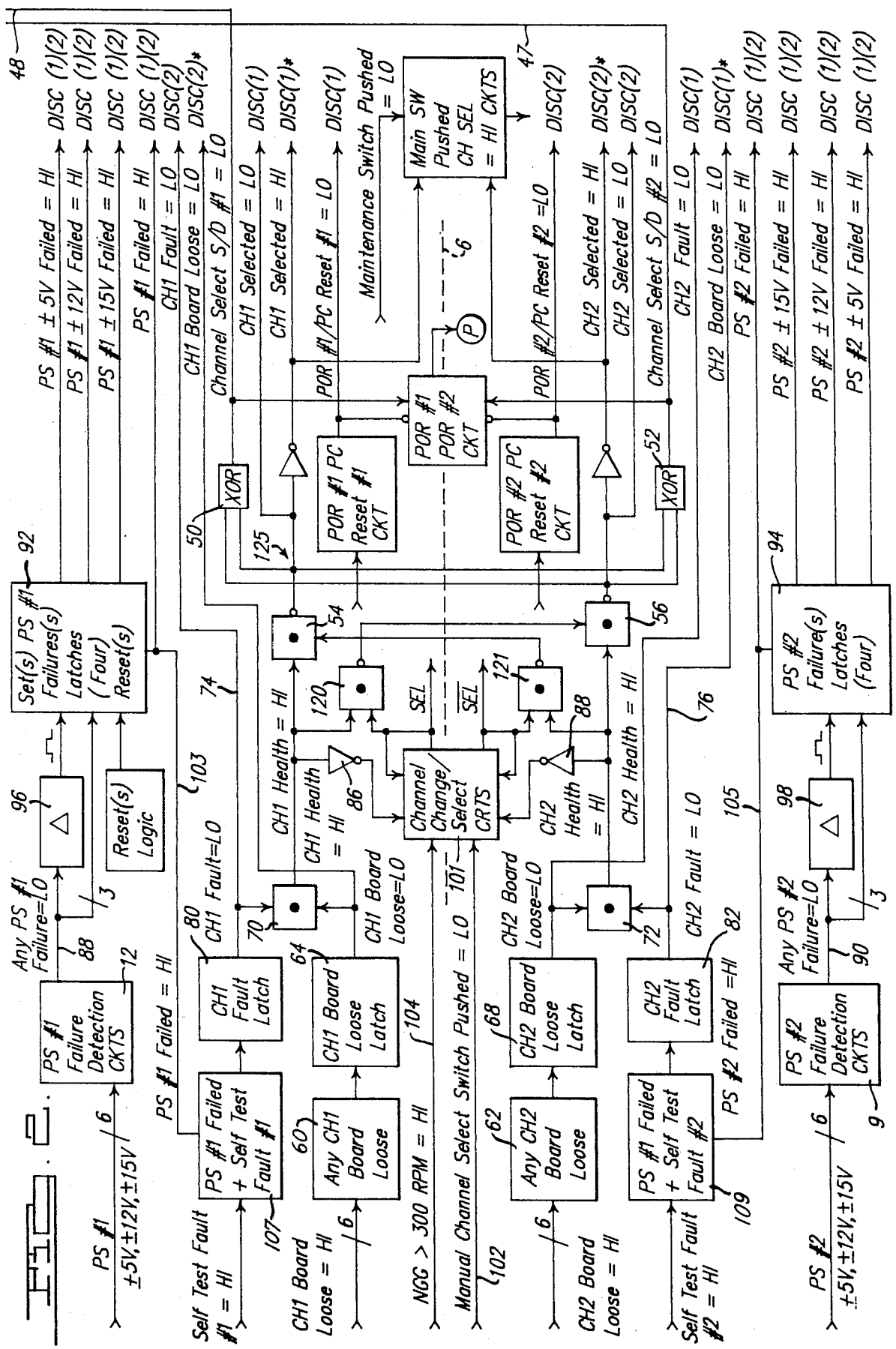

DIGITAL CONTROL FOR GAS TURBINE ENGINE

The United States Government has rights in this invention pursuant to Contract No. N00024-81-C-4228, awarded by the Department of the Navy.

The present invention relates to hardware and software which switches authority from one channel to another in a gas turbine engine control.

BACKGROUND OF THE INVENTION

Engine controls for gas turbine engines frequently include a first, primary control and a second, backup control. Switching from the primary control to the backup control is done in order to respond to malfunctions, including those within the engine, the control, or power supplies.

OBJECTS OF THE INVENTION

It is an object of the invention to provide a new and improved system for switching between channels of a gas turbine engine control.

BRIEF DESCRIPTION OF THE DRAWING

FIGS. 1 and 2 illustrate a block diagram of one form of the present invention.

SUMMARY OF THE INVENTION

In one form of the present invention, hardware and software sense faults which require switching of the control of the engine from one channel to another and, in response, switch control. If the faults indicate that neither channel is operative, the invention terminates fuel delivery, thus stopping the engine.

DETAILED DESCRIPTION OF THE INVENTION

FIGS. 1 and 2 are generally symmetrical about lines 3 and 6. This means that the top half of each Figure contains apparatus affecting one control channel, while the bottom half contains analogous apparatus affecting the other channel. For example, in FIG. 2, block 9 (lower left) refers to the testing of the electrical power supply for the first channel, while block 12 (upper left, on the other side of the line 6) refers to an analogous testing of the power supply for the other channel. (This symmetry does not apply to blocks 14A-E in FIG. 1, although these blocks do provide symmetrical signals, such as those on lines 16A and B. Also, the blocks at the top left of FIG. 1, namely blocks 15A-C, have no symmetric counterparts.)

The blocks to the left of FIGS. 1 and 2 (e.g., 14A-E in FIG. 1) refer to a group of conditions which trigger the present invention into action. The invention, in response to the conditions, either switches authority from one control channel to another, terminates fuel delivery to the engine, or perhaps both. FIG. 1 illustrates circuitry for terminating fuel delivery.

In general, the occurrence of one or more of the conditions identified in blocks 14A-E to the left of the Figure trigger the appropriate latch immediately to the right of that block, thus applying a digital zero signal (indicated in the Figure as LO) to either of AND gates 20 or 22 in the center of the Figure. Outputs of the AND gates are fed to fuel shutoff valves FSV #1 and #2 (indicated by coils 24 and 26) which shut off fuel. The two valves are connected in series, that is, the fuel delivered to the engine must flow through both valves. If either valve is closed, the fuel supply is terminated. Therefore, if one of the FSV's should fail, the remaining FSV can still terminate fuel delivery if necessary. This fuel termination will now be described in more detail.

Signals on lines 28 and 30 (on the left side) activate FSV's 1 and 2 as follows. A HI signal on these lines will allow AND gates 20 and 22 to respond to their other input signals. Otherwise, the AND gates will produce LO signals as outputs, thereby responding to none of their other inputs. Further, a LO signal on these lines 28 and 30 forces the outputs 32 and 34 of the respective AND gates to a LO condition, thereby cutting off FSVs 1 or 2 and terminating fuel supply. The blocks labeled EMERGENCY/MANUAL STOP SWITCH 14A and MANUAL STOP SWITCH 14B (at the left of the Figure) provide a somewhat similar function in allowing an operator to manually terminate fuel delivery. The difference between the two blocks is that the two stop switches are located at different places. For example, the switch represented by block 14A may be located in a ship's pilot house, while that of block 14B may be closer to the engine.

NPT Overspeed block 14C triggers an NPT Overspeed latch when the power turbine of the engine exceeds a predetermined speed, thereby feeding LO signals to the inputs of the AND gates. Block 14D, labeled NPT<100 RPM AND (the dot refers to logical AND) NPT LOSS O/R ACT BAR AND NGGR>7100 RPM, refers respectively to the condition of power turbine speed (NPT) being less than 100 rpm, the loss of power turbine speed signal (NPT loss) and gas generator speed (NGGR) exceeding 7100 rpm. If any one of these three conditions occur, the NPT QUICK LATCH is triggered, thereby applying a LO signal to AND gates 20 and 22.

POR #1 and POR #2 block, also mentioned in the discussion following, triggers INITIATE INHIBIT latch to the right, thereby applying a LO signal to the AND gates. The POR #1 and #2 block functions to terminate fuel delivery in the event of a permanent or temporary power supply failure, as later described in more detail. If fuel were not terminated, an explosive relight could occur, thereby damaging the engine. The measuring circuitry just described is known in the gas turbine engine art and is not part of the present invention. That is, gas generator speed measurement, power turbine speed measurement, and detection of the loss of the power turbine speed signal are well known, so that the signals provided to the NPT OVERSPEED latch, the NPT QUICK latch, and the INITIATE INHIBIT latch are provided by apparatus known in the art.

To the right center in FIG. 1 is a group of lines, all labeled DISC(1)(2). These refer to discrete, individual lines carrying the signals as indicated from the inputs of the AND gates. These lines also carry signals labeled FSV #1 and FSV #2 CURRENT. These latter signals are provided by current sensing circuits, known in the art, and contained in blocks in FSV #1 and #2, i.e., blocks 36 and 38. These signals indicate whether the currents drawn by the respective valves are within the proper operating range of 0.5 to 2.5A as indicated. The informational DISC lines extend to the location of the operator of the engine, such as to the captain of a ship. The lines are informational, and may also be used to gather information for computer software which controls other parts of the engine.

The current sensing circuits in blocks FSV #1 and #2 feed signals on lines 40 and 42 when the valve current goes too high (3.0 amps, in this case, as indicated). Lines 40 and 42 trigger FSV #1 and #2 OVER CURRENT latches (located above and below blocks FSV #1 and #2.) The outputs of the latches, lines 44 and 46, are fed to the AND gate's inputs and labeled, e.g., as FSV #1 O/C=LO. The latch outputs 44 and 46 also connect to the information DISC bus to the right.

To repeat, the upper AND gate 20 receives digital signals indicative of: an overcurrent in failsafe valve #1 (FSV #1O/C on line 44), a channel select shutdown signal (CH SEL S/D#1) which has not yet been discussed; an activating signal (OFF SIG); an emergency stop signal (EMERG/MAN ST SW PUSHED); a manual stop signal (MANUAL ST SW PUSHED); a power turbine overspeed signal (NPT OVERSPEED); a signal indicative of one of the following: power turbine underspeed, power turbine signal loss, or gas generator exceeding 7100 rpm (collectively termed NPT QUICK); and a power supply outage signal (INITIATE INHIBIT). When any one of these signals occurs (that is, the line carrying it goes logic LO) the input to block FSV #1 (block 36) goes logic LO, thereby shutting off fuel supply valve #1, indicated by coil 24. AND gate 22 functions similarly with respect to FSV #2 (block 38).

The Channel select signals (e.g., CH SEL S/D #1) which are fed to these AND gates (second from the top for AND gate 20 and second from the bottom for AND gate 22) will now be discussed. These signals are produced by the circuitry on FIG. 2 and carried by lines 47 and 48 in the upper right corner (lower right in FIG. 1). These lines are the outputs of exclusive OR (XOR) blocks 50 and 52. The XOR input blocks are connected to the outputs of NAND gates 54 and 56. NAND gate 54 produces an output of logic LO when channel 1 of the engine control is to be selected, as indicated by the symbol CH 1 SELECTED=LO to the right of this NAND gate. Similarly, NAND gate 56 functions with respect to channel 2.

As shown, both outputs are inputted to XOR gates 50 and 52. XOR gates, in general, produce an output of logic 1 only when they receive one input of HI and the other input of LO. Thus, when the NAND gates 54 and 56 properly select one channel and deselect the other (that is, produce a respective logic HI and a logic LO in a manner later discussed) XOR gates 50 and 52 both produce a logic HI signal. Thus, a logic HI signal is fed to both AND gates 20 and 22 in FIG. 1, on lines 46 and 48 thereby allowing fuel to flow to the engine if the other inputs to the AND gates 20 and 22 so allow.

However, if, through malfunction, NAND gate 54 calls for channel 1 to be selected while NAND 56 at the same time calls for channel 2 to be selected, XOR gates 50 and 52 will both receive two logic LO signals, causing them to both transmit logic LO signals on lines 46 and 48 to AND gates 20 and 22. Thus, AND gates 20 and 22 in FIG. 1 shut off fuel flow.

Further, if NAND gates 54 and 56 in FIG. 2 both produce logic LO signals (as opposed to logic HI signals as just discussed), in attempting to deselect both channels 1 and 2, XOR blocks 50 and 52 will both produce logic LO signals, again terminating fuel supply. Therefore, the present invention contains a means for detecting the simultaneous selection or simultaneous deselection of both control channels by NAND gates 54 and 56. The apparatus in FIG. 2 to the left of NAND gates 54 and 56 which activate these NAND gates will now be discussed.

Blocks 60 and 62, to the left of the Figure, indicate circuitry known in the art which examines the circuit boards of the engine control (not shown) and triggers the latches 64 and 68, to the right, in response to detection of a loose or disconnected circuit board. The latches 64 and 68 feed signals to AND gates 70 and 72 as well as to the informational DISC bus (on the right) on lines 74 and 76. Also fed to AND gates 70 and 72 are signals produced by FAULT latches 80 and 82. These latches respond to FAILURE DETECTION blocks 12 and 9. These DETECTION blocks monitor the power supplies, which supply +5 volts, +12 volts, and ±15 volts, for each control channel (a total of 8, 4 for each). Such monitoring is known in the art.

When the DETECTION blocks 9 or 12 find that a power supply has failed, they pull respective lines 88 or 90 LO, thus setting PS FAILURE latch 92 or 94 by means of a pulse sent by differentiators 96 or 98. PS FAILURE latches 92 and 94 actually contain four latches, as indicated, one for each power voltage. The PS FAILURE latches 92 and 94 send HI signals (i.e., PS FAILED signals) when triggered on lines 103 and 105 to OR blocks 107 and 109. There, the PS FAILED signals are ORed with operator-supplied SELF TEST signals and, if either signal is HI, the respective latch 80 or 82 (to the right of the OR gates) is triggered, thus forcing the HEALTH signals (the inputs to NAND gates 54 or 56) to go LO. Also, the lines 103 and 105 are connected to the DISC bus.

Restated, AND gates 70 and 72 each receive a signal indicative of power supply condition (e.g., CH 2 FAULT) and circuit board condition (e.g., CH 2 BOARD LOOSE). The outputs of AND gates 70 and 72 are health signals and are fed to inverters 86 and 88 as well as to NAND gates 54 and 56, previously mentioned. As indicated, a logic HI signal on the relevant health signal line (e.g., on the output of NAND gate 70) indicates that the respective channel is healthy as respects power supply and board looseness. By inputting the HEALTH signals to other NAND gates (NAND 54 for channel 1 and NAND 56 for channel 2), the selection of the relevant channel is enabled or disabled. That is, the output of either NAND 54 or 56 cannot go LO (thus selecting a channel) unless the NAND 54 or 56 receives a health signal HI input. Therefore, when both channels are healthy (i.e., both health signals are HI), channel switching is controlled by the outputs of block 101, now to be discussed.

The block labeled CHANNEL CHANGE/SELECT CRTS 101, near the left center, receives four signals (from inverters 86 and 88 and on lines 102 and 104) and responds as follows. It receives the output of inverter 88 which is logic LO when channel 2 is healthy. It receives a signal on line 102 which is connected to a switch (not shown) controlled by an operator. When the operator causes line 102 to go logic LO, the CHANNEL CHANGE block 101 toggles and its output lines SEL and SEL BAR both change state. The CHANNEL CHANGE block 101 also receives a gas generator underspeed signal (NGG>300 rpm) on line 104. The signal is actually an underspeed signal despite the fact that it is labeled in terms of NGG greater than 300 because when NGG is less than 300, the line goes logic LO, causing the CHANNEL CHANGE block 101 to toggle. Thus, during engine startup, a channel is automatically selected by the toggling induced by the change in logic state of line 104 at 300 rpm. Also, if the outputs of inverters 86 and 88 indicate that the respective channels have become unhealthy, the CHANNEL CHANGE block 101 toggles, switching to the other channel. Thus, not only do the health signal lines disable the selection of an unhealthy channel, but also they cause block 101 to toggle, thus selecting the other channel.

The Applicants point out the following important features of the CHANNEL CHANGE block 101 and associated NAND gates 54, 56, 120 and 121. If both channels are healthy, the outputs of NAND gates 54 and 56 will be determined by the output of CHANNEL CHANGE block 101, namely SEL and SEL BAR. Under these conditions, whichever output is logic LO will cause the NAND gate to which it is connected to produce logic HI. For example, if SEL BAR is logic LO, NAND gate 121 will produce logic HI as output. This output, when fed to NAND gate 54, will produce a logic LO signal on line 125, thus indicating that channel 1 should be selected. Simultaneously, the logic HI signal of line SEL will cause the output of NAND gate 120 to go LO, thus causing the output of NAND gate 56 to go logic HI, because of the high input on CH 2 HEALTH, thus deselecting channel 2. Under these circumstances, XOR blocks 50 and 52 produce logic HI signals, thus allowing fuel to flow through the FSVs in FIG. 1.

As mentioned, channel 1 is selected and channel 2 is deselected. However, should channel 2 go unhealthy so that line CH 2 HEALTH goes logic LO, this forces the output of NAND gate 121 to go logic HI. This effectively removes control of line 125 from the CHANNEL CHANGE block 101 because the LO signal on line CH 2 HEALTH causes the output of NAND gate 121 to be logic HI irrespective of the signal on line SEL BAR. Further, only if the other input to NAND gate 54, namely, CH 1 HEALTH, is HI, will the output of NAND gate 54 be logic LO. In this case, channel 1 is selected in response to the lack of health of channel 2.

Still further, XOR gates 50 and 52 monitor the outputs of NAND gates 54 and 56 and do the following: if either or both channels are selected by NAND gates 54 and 56 (a fault condition) then the XOR gates 50 and 52 pull lines 48 and 47 LO. This causes AND gates 20 and 22 in FIG. 1 to close both FSV 1 and 2.

An invention has been described which can be viewed in two parts: a fuel shutoff monitor in Figure 1 and a switchover monitor in FIG. 2. The fuel shutoff monitor responds to predetermined engine conditions, such as those indicated in blocks 14D and E. It also responds to the over- or undercurrent of the FSV's, and it responds to the shutoff signals on lines 47 and 48. In response to these signals, the fuel shutoff monitor terminates fuel supply by closing one or both of the FSV's.

The switchover monitor in FIG. 2 responds to electrical problems, such as power supply failures and circuit board looseness. It also responds to manual switchover requests (on line 102) and to engine speed reaching 300 rpm, on startup (line 104). In response, the switchover monitor changes channels of the engine control. However, switching is allowed only if the new channel has proper conditions of power supply and circuit board looseness. Further, switching automatically occurs if the present channel develops a problem in board looseness or its power supply. Still further, if both or neither channels are attempted to be switched, XOR gates 50 and 52 send signals on lines 47 and 48 to the AND gates 20 and 22 in FIG. 1 to thereby close both FSV's.

Numerous modifications and substitutes can be undertaken without departing from the true spirit and scope of the present invention. What is desired to be secured by Letters Patent is the invention as defined by the following claims.

We claim:

1. A dual-change control for a gas turbine engine, comprising:
   (a) first and second fuel shutoff valves (FSV's) through which fuel flows in series to the engine, either valve being capable of terminating fuel flow;
   (b) first and second AND gate means for
      (i) receiving signals indicative of selected engine operating conditions;
      (ii) receiving signals indicative of the electric current drawn by each FSV;
      (iii) terminating fuel flow through at least one FSV when any one of the signals of
   (b)(i) or (b)(ii) attain a predetermined state.

2. A control according to claim 1 and further comprising:
   (c) channel change means (101) for doing the following:
      (i) receiving signals indicative of the status of power supplies;
      (ii) receiving signals indicative of circuit board looseness; and
      (iii) in response to the signals of (c)(i) and (c)(ii), switching control of the engine from one channel to the other.

3. A control according to claim 2 and further comprising:
   (d) means for (i) preventing the selection of a channel by the channel change means (101) in response to the signals of (c)(i) and (c)(ii) and for
      (ii) keeping control in the presently controlling channel even if the signals of (c)(i) or (ii) indicate that control should be switched.

4. A control according to claim 3 and further comprising:
   (e) first fuel shutdown means (50) for
      (i) receiving signals indicative of which channels are selected and transmitting a signal to the first AND gate means for closing the first FSV if either of the following occurs: both channels are selected or neither channel is selected.

5. A control according to claim 4 and further comprising:
   (f) a second fuel shutdown means (52) for
      (i) receiving signals indicative of which channels are selected and transmitting a signal to the second AND gate means for closing the second FSV if either of the following occurs: both channels are selected or neither channel is selected.

6. A switchover system for a gas turbine engine control which has two channels comprising:
   (a) a switchover monitor (FIG. 2) comprising:
      (i) a first power supply detector comprising
         A. means for monitoring a first power supply and for producing a CH1 FAULT signal in response to a failure in the first power supply;
         B. means for monitoring a first circuit board and for producing a CH1 BOARD LOOSE signal in response to a loose electrical connection;
         C. means (70) for producing a CH1 HEALTH signal in response to the CH1 FAULT and CH1 BOARD LOOSE signals;
      (ii) a second power supply detector comprising A. means for producing a CH2 FAULT signal in response to a failure in the second power supply;
B. means for monitoring a second circuit board and for producing a CH2 BOARD LOOSE signal in response to a loose electrical connection therein;
C. means (72) for producing a CH2 HEALTH signal in response to the CH2 FAULT and CH2 BOARD LOOSE signals;

(iii) channel changing means (101) for switching engine control from one channel to the other in response to the CH1 HEALTH and CH2 HEALTH signals and in response to a signal sent by an operator;

(iv) means for preventing a switch of control to the first channel when a predetermined CH1 HEALTH signal exists;

(v) means for preventing a switch of control to the second channel when a predetermined CH2 HEALTH signal exists;

(vi) means for producing a first CHANNEL SELECT S/D #1 signal if either of the following occurs: both channels are selected or neither channel is selected;

(vii) means for producing a second CHANNEL SELECT S/D #2 signal if either of the following occurs: both channels are selected or neither channel is selected;

(b) a fuel shutoff monitor (FIG. 1) comprising
(i) first and second fuel shutoff valves (FSV's) through which fuel flows to the engine in series, each valve being capable to independently terminate the fuel flow,
(ii) first AND means (20) for doing the following
A. receiving signals indicative of the condition of predetermined engine operating conditions;
B. receiving a signal indicative of the current drawn by the first FSV;
C. receiving the CHANNEL SELECT S/D #1 signal of (a)(vii);
D. closing the first FSV when any of the signals of (A), (B), or (C) reach a predetermined state;
(iii) second AND means (22) for doing the following
A. receiving signals indicative of the condition of predetermined engine operating conditions;
B. receiving a signal indicative of the current drawn by the first second FSV;
C. receiving the CHANNEL SELECT S/D #2 signal of (a)(vii); and
D. closing the second FSV when any of the signals of (A), (B), or (C) reach a predetermined state.

* * * * *